(12) United States Patent
Clark et al.

(10) Patent No.: US 9,940,364 B2
(45) Date of Patent: Apr. 10, 2018

(54) OBTAINING DESIRED WEB CONTENT FROM A MOBILE DEVICE

(71) Applicant: International Business Machines Corporation, Armonk, NY (US)

(72) Inventors: Adam T. Clark, Mantorville, MN (US); Aspen L. Payton, Byron, MN (US); John E. Petri, St. Charles, MN (US); Kevin Wendzel, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 14/264,242

(22) Filed: Apr. 29, 2014

(65) Prior Publication Data

US 2015/0293998 A1    Oct. 15, 2015

Related U.S. Application Data

(63) Continuation of application No. 14/251,971, filed on Apr. 14, 2014, now Pat. No. 9,798,779.

(51) Int. Cl.
*G06F 7/00*       (2006.01)
*G06F 17/30*      (2006.01)
*G06F 17/22*      (2006.01)

(52) U.S. Cl.
CPC ...... *G06F 17/3053* (2013.01); *G06F 17/2247* (2013.01); *G06F 17/30864* (2013.01); *G06F 17/30867* (2013.01); *G06F 17/30905* (2013.01)

(58) Field of Classification Search
CPC .............. G06F 17/30905; G06F 17/30864
(Continued)

(56) References Cited

U.S. PATENT DOCUMENTS 8,996,514 B1 *   3/2015  Gomes .............. G06F 17/30905
                                                   707/706
2006/0212451 A1   9/2006  Serdy et al.
(Continued)

FOREIGN PATENT DOCUMENTS

WO       2009012461 A1    1/2009

OTHER PUBLICATIONS

U.S. Application entitled Obtaining Desired Web Content for a Mobile Device, U.S. Appl. No. 14/251,971, filed Apr. 14, 2014.
(Continued)

*Primary Examiner* — Van H Oberly
(74) *Attorney, Agent, or Firm* — Patterson + Sheridan, LLP (57) ABSTRACT

Methods and systems to obtain desired web content for a mobile device are disclosed. Users access web pages with mobile devices such as smart phones in addition to their non-mobile devices. In order to conveniently display information on mobile devices having smaller screens, mobile versions of web pages offering abridged content are available as well as non-mobile versions. When a web page is selected from search results provided from a query in a web search, the mobile or non-mobile versions of the web page may be delivered. By delivering a web page version to a mobile device based on relevance rankings determined for the non-mobile and mobile versions of the web page, desired content is more efficiently delivered. In this manner, a search experience may be improved by reducing deliveries of mobile versions of web pages to mobile devices where an alternative non-mobile version of the web page is preferred.

10 Claims, 8 Drawing Sheets

(58) Field of Classification Search
USPC .......................................................... 707/728
See application file for complete search history.

(56) References Cited

U.S. PATENT DOCUMENTS

| | | |
|---|---|---|
| 2008/0172374 A1* | 7/2008 | Wolosin .............. G06F 17/3087 |
| 2008/0183699 A1* | 7/2008 | Hu .................... G06F 17/30864 |
| 2009/0006338 A1 | 1/2009 | Ives et al. |
| 2009/0210514 A1* | 8/2009 | Davis ................ G06F 17/30905 |
| | | 709/219 |
| 2013/0151552 A1 | 6/2013 | Sugawara et al. |
| 2013/0152009 A1 | 6/2013 | Caliendo, Jr. et al. |
| 2013/0174014 A1 | 7/2013 | Kwan et al. |
| 2015/0193396 A1* | 7/2015 | Schneckloth ....... G06F 17/2247 |
| | | 715/229 |

OTHER PUBLICATIONS

Meunier, Transcript of Scott Huffman Presentation on Mobile Search at Google Searchology, Jun. 13, 2009, pp. 1-17.
Nielsen, Mobile Site vs. Full Site, Apr. 10, 2012, pp. 1-8.

* cited by examiner

OBTAINING DESIRED WEB CONTENT FROM A MOBILE DEVICE

CROSS-REFERENCE TO RELATED APPLICATIONS

This application is a continuation of co-pending U.S. patent application Ser. No. 14/251,971, filed Apr. 14, 2014. The aforementioned related patent application is herein incorporated by reference in its entirety.

BACKGROUND

The present invention relates to data processing and information retrieval, and more specifically, to organizing information on a network and responding to search inquiries related to that information on the network.

Today, more and more users are accessing the web using mobile devices such as smartphones and tablets. These devices are designed to be mobile and hence have a smaller screen than non-mobile devices such as traditional desktops and laptops. In response to this, web developers are designing mobile versions of their website which are designed to be viewed on smaller screens. When users enter web addresses into mobile browsers of mobile devices or attempt to retrieve websites identified as part of search results from a web engine, web servers responding to the browsers detect that mobile devices are attempting to retrieve web pages and automatically redirect the users to mobile versions of the web pages even though the users may prefer in some cases the non-mobile version of the web page containing more desired information in an unabridged format.

Indeed, issues may often arise when mobile devices are automatically redirected to mobile versions of web pages when performing web searches. For example, in most cases, to allow for the smaller screen, a portion of the content may need to be removed from a non-mobile version of a web page to create the mobile version of the web page. While the removed content may be considered less important to some users, other users of the mobile devices may want to view this data. Some approaches are currently available to ensure mobile device users have access to content within non-mobile versions of web pages. One approach involves providing links on the mobile versions of web pages to the non-mobile web pages. However, often these links bring users to non-mobile versions of home pages of the website, rather than to the non-mobile versions of the specific web page the users were seeking as part of a web search query to access. Another approach involves changing metadata that mobile browsers present to web servers to automatically direct mobile device users to non-mobile versions of web pages rather than the mobile versions. However, experience indicates most users prefer the mobile version of the website and only infrequently desire access to non-mobile versions of web pages. What is needed is a new approach to obtain desired web content for a mobile device available on mobile and non-mobile versions of web pages when performing web searches.

SUMMARY

Embodiments disclosed herein include obtaining desired web content for a mobile device. Users access web pages with mobile devices such as smart phones in addition to their non-mobile devices. In order to conveniently display information on mobile devices having smaller screens, mobile versions of web pages offering abridged content are available as well as non-mobile versions. When a web page is selected from search results provided from a query in a web search, the mobile or non-mobile versions of the web page may be delivered. By delivering a web page version to a mobile device based on relevance rankings determined for the non-mobile and mobile versions of the web page, desired content is more efficiently delivered. In this manner, a search experience may be improved by reducing deliveries of mobile versions of web pages to mobile devices where an alternative non-mobile version of the web page is preferred.

In one embodiment, a method of data processing is disclosed in a networked environment. The method may include receiving a query for a web search from a user device. The method may also include identifying a web page of a website with the web search based on the query, and the website includes a mobile version and a non-mobile version of the web page. The method may also include identifying a type of the user device. The type of the user device being one of a mobile device or a non-mobile device. The method may also include comparing relevance rankings based on the query for the mobile version and the non-mobile version of the web page. The method may also include determining a version of the web page to be received by the user device. The version of the web page may be determined to be one of the mobile version of the web page and the non-mobile version of the web page. The determining the version of the web page may be based on the type of the user device and the comparing of the relevance rankings. In this manner, a user may more efficiently receive content for a mobile device from the mobile version and the non-mobile version of the web page.

In another embodiment, a system may be disclosed. The system may include a processor and memory containing a program that, when executed by the processor, performs an operation for retrieving and delivering internet content for an application. The operation may include receiving a query for a web search from a user device. The operation may also include identifying a web page of a website with the web search based on the query. The website may include a mobile version and a non-mobile version of the web page. The operation may also include identifying a type of the user device. The type of the user device may be one of a mobile device and a non-mobile device. The operation may also include comparing relevance rankings based on the query for the mobile version and the non-mobile version of the web page. The operation may also include determining a version of the web page to be received by the user device. The version of the web page may be determined to be one of the mobile web page and the non-mobile web page. The determining the version may be based on the type of the user device and the comparing of the relevance rankings of the mobile version and the non-mobile version of the web page. In this manner, the system may have a higher performance by reducing a number of unneeded web page requests to web servers as users receive desired web content more efficiently.

In another embodiment, a computer program product is disclosed. The computer program product may comprise a computer-readable storage medium having computer-readable program code embodied therewith. The computer-readable program code may include computer-readable program code configured to receive a query for a web search from a user device. The computer-readable program code may also include computer-readable program code configured to identify a web page of the website with the web search based on the query. The website including a mobile version and a non-mobile version of the web page. The computer-readable program code may also include may also include computer-readable program code configured to identify a type of the user device. The type of the user device being one of a mobile device and a non-mobile device. The computer-readable program code may also include may also include computer-readable program code configured to compare relevance rankings based on the query for the mobile version and the non-mobile version of the web page. The computer-readable program code may also include computer-readable program code configured to determine a version of the web page to be received by the user device. The version of the web page may be determined to be one of the mobile version and the non-mobile version of the web page. The determining the version may be based on the type of the user device and the comparing of the relevance rankings of the mobile version and the non-mobile version of the web page. In this manner, fewer retrievals of the mobile version of the website may occur as desired information available on the non-mobile version may be delivered more efficiently to the mobile device user.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings and included to provide a further understanding, and are incorporated in and constitute a part of this specification. The drawings illustrate one or more embodiment(s), an together with the description serve to explain principles and operation of the various embodiments.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include obtaining desired web content for a mobile device. Users access web pages with mobile devices such as smart phones in addition to their non-mobile devices. In order to conveniently display information on mobile devices having smaller screens, mobile versions of web pages offering abridged content are available as well as non-mobile versions. When a web page is selected from search results provided from a query in a web search, the mobile or non-mobile versions of the web page may be delivered. By delivering a web page version to a mobile device based on relevance rankings determined for the non-mobile and mobile versions of the web page, desired content is more efficiently delivered. In this manner, a search experience may be improved by reducing deliveries of mobile versions of web pages to mobile devices where an alternative non-mobile version of the web page is preferred.

Figure 1:
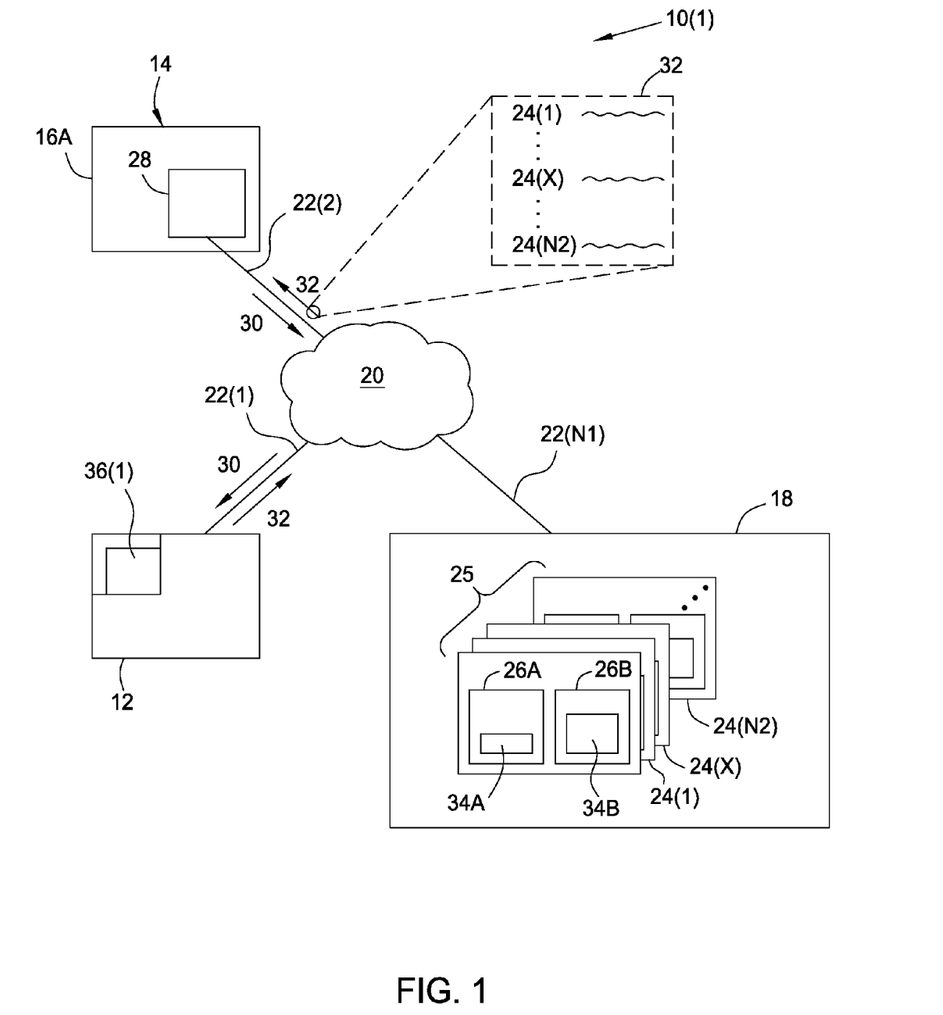
FIG. 1 is a schematic diagram of one embodiment of an exemplary networked environment illustrating a mobile device configured to receive either a mobile version or a non-mobile version of a web page of a website according to a versioning system disposed at a search engine which determines relative rankings of the non-mobile and mobile web pages.

In this regard, FIG. 1 is a schematic diagram of an exemplary networked environment 10(1) enabling a search engine 12 to be accessed by a user device 14 to perform web searches to thereby find desired informational content. The networked environment 10(1) may comprise the search engine 12, the at least one user device 14, and at least one web server 18 interconnected to exchange data across a network 20. The network 20 may include one or more of a local area network (LAN), wide area network (WAN), and the Internet. The network 20 may be accessed by one or more communications links 22(1)-22(N1) which may be wired communications links (e.g., copper, optical fiber, etc.) and/or wireless communications links. In this manner, the user device 14 may perform web searches using the search engine 12 to obtain desired information.

It is noted the user device 14 depicted in FIG. 1 is a mobile device 16A, but the user device 14 could alternatively be a non-mobile device 16B (as depicted later in FIG. 4). An exemplary embodiment of the mobile device 16A, may be a smartphone utilizing the communications link 22(3) which is part of a cellular network to access the network 20.

The network 20 enables the user device to be interconnected to exchange information with various components also connected to the network 20. One such component may be the web server 18 which may host at least one web page 24(1)-24(N2) (or documents) of a website 25. Each of the web pages 24(1)-24(N2) may include a mobile version 26A and a non-mobile version 26B. In this manner, the user device 14 may request from the web server 18 and receive from the web server 18 either the mobile version 26A or the non-mobile version 26B of any of the web pages 24(1)-24(N2) from the website 25.

Another component that may be connected to the network 20 and thereby accessible by the user device 14 is the search engine 12. The search engine 12 enables the user device 14 to determine one or more of the web pages 24(1)-24(N2) may be desirable to the user when a specific target web page and associated address is not known.

The user device 14 may comprise a browser 28, which may be configured to send information and receive information over the network 20 to the search engine 12 and the web server 18. For example, the browser 28 may be configured to send the search engine 12 a query 30 through the network 20 to perform web searches. The query 30 may include information (e.g., keywords, numbers, etc.) to be used by the user to concisely describe information of interest in web pages 24(1)-24(N2). The browser 28 may also be configured to receive search results 32 from the search engine 12 via the network 20 in response to the query 30. The search results 32 may comprise addresses, for example, in hypertext format of the web pages 24(1)-24(N2) of websites depending on the respective ones of the query 30. In this regard, the user device 14 may interact with the network 20 to perform web searches to identify location addresses of the web pages 24(1)-24(N2) which may each comprise the mobile versions 26A and the non-mobile versions 26B of the web pages 24(1)-24(N2).

As mentioned briefly earlier, the browser 28 may be configured to present a user of the user device 14 with the search results 32. The search results 32 may include information comprising the list of, for example, the web pages 24(1)-24(N2) which the search engine 12 may have determined to be relevant based on the query 30 submitted by the user device 14. The user may use the user device 14 to select one of the web pages 24(1)-24(N2) from the search results 32. The selected one "web page 24(X)" of the web pages 24(1)-24(N2) may comprise the mobile version 26A and the non-mobile version 26B. The mobile version 26A may be formed of resources 34A and the non-mobile version 26B may be formed of resources 34B. The resources 34A, 34B may comprise information, for example, in the form of hypertext markup language (HTML) pages, portable document format (PDF) documents, images, word processing documents, video or movies, and/or feed sources. The information in the resources 34A, 34B may comprise words, phrases, alphanumeric strings, images, sound and embedded information (e.g., meta information and hyperlinks) and/or embedded instructions (e.g, scripts). The resource 34A may contain different content than the resource 34B, meaning one or more of the resources 34A, 34B may contain information not included in both resources 34A, 34B and/or information may be missing or otherwise purposefully not included in one of the resources 34A, 34B, but not in both of the resources 34A, 34B. In this manner, each of the resources 34A, 34B may have different desirability according to the user.

Relevance rankings are utilized in order to determine desirability. Accordingly, the mobile version 26A and the non-mobile version 26B of the web page 24(X) may be assigned respective relevance rankings by a versioning system 36(1) disposed at the search engine 12. The versioning system 36(1) determines the relevance rankings using information (e.g., keywords) in the query 30 as appearing or not appearing in the resources 34A, 34B. For example, the relevance rankings may be based on at least one of: a presence or absence in the resources 34A, 34B of terms in the query 30, occurrence in the resources 34A, 34B of the terms in the query 30, relative positions in the resources 34A, 34B of terms in the query 30, and statistics of previous visitations of the types of user devices 14 to the mobile version 26A and the non-mobile version 26B of the web page 24(X). In one non-limiting embodiment of statistics of previous visitation, if the versioning system 36(1) observed that at least a threshold portion (for example: ninety percent) of users having the same or similar information in the query 30 were previously directed to the mobile version 26A of the web page 24(X) and the users immediately followed up by switching to the non-mobile version 26B of the web page 24(X), this exemplary statistic may be used as a factor to determine the relevance rankings. Accordingly, based on the relevance rankings as determined by the versioning system 36(1) disposed at the search engine 12, the web server 18 may then make available to the user either the mobile version 26A or the non-mobile version 26B of the web page 24(X) in response to the user selecting the web page 24(X). In this manner, the user may more efficiently receive information in response to submitting the query 30 as opposed to if the user received either one of the mobile version 26A or the non-mobile version 26B merely based on whether the user device 14 was the mobile device 16A or the non-mobile device 16B.

Now that the networked environment 10(1) has been briefly introduced, details of the mobile device 16A, the non-mobile device 16B, the search engine 12, and the web server 18 will be discussed relative to FIGS. 2 through 5. Networked environments 10(2), 10(3), which are other embodiments of the networked environment 10(1), will then be discussed relative to FIGS. 6 and 7 before introducing an exemplary method 38 for delivering, in response to web search, the mobile version 26A or the non-mobile version 26B of a web page 24(X) from a website 25.

Figure 2:
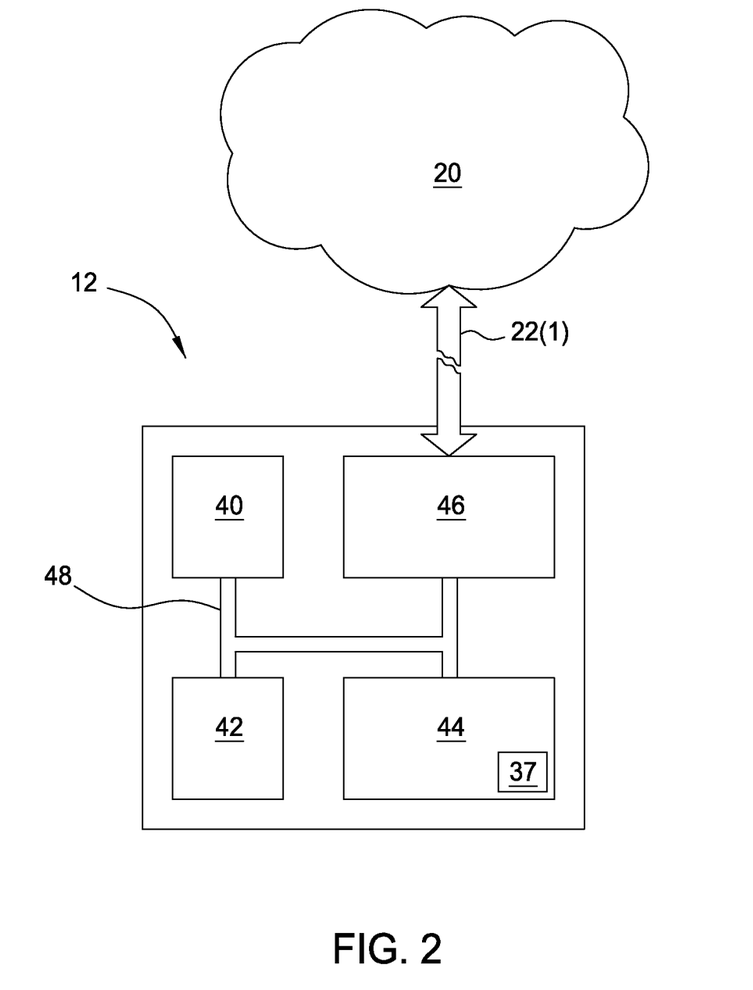
FIG. 2 is a schematic diagram of an exemplary embodiment of a search engine of the networked environment of FIG. 1.

In this regard, FIG. 2 is a schematic diagram of an exemplary embodiment of the search engine 12. The search engine 12 may include a processor 40, a memory 42, a storage device 44, and an input/output device 46 interconnected with a system bus 48. The processor 40 may execute instructions resident within the memory 42 and/or the storage device 44. The instructions may be part of the versioning system 36(1). In this manner, the search engine 12 may determine the search results 32 in response to the query 30 received from the user device 14 and help determine the most relevant version of either the mobile version 26A or the non-mobile version of the web page 24(X) selected by the user from the search results 32.

The memory 42 of the search engine 12 may be configured to store information within the search engine 12 and may be a computer-readable medium and may comprise volatile or non-volatile memory units, for example, dynamic random access memory (DRAM) units. The storage device 44 may be configured to provide mass storage for the search engine 12. In one embodiment the storage device 44 may be a computer-readable medium and may comprise, for example, at least one hard disk drive, at least one optical disk device, a large capacity storage device, and/or at least one network storage device shared by multiple computing devices over the network 20, or some other large capacity storage device. The input/output device 46 of the search engine 12 facilitates the arrival and departure of information between the search engine 12 and the network 20. In one embodiment the input/output device 46 may, for example, comprise one or more of a network interface devices, e.g., an Ethernet card, a serial communication device, e.g., and RS-232 port, and/or a wireless interface device, e.g., and 802.11 card.

The search engine 12 may store content on the storage device 44 from various web pages 24(1)-24(N2) of the websites 25 available from the network 20. The information or content (e.g., the resources 34A, 34B) may be identified using web crawler computer code instructions resident on the search engine 12 to systematically browse the network 20. The search engine 12 indexes the instructions (or "content") by providing data about each web page in an index database 45 for efficient searching when the query 30 may be received. An exemplary index data base is depicted in FIG. 2 within the storage device 44. In this manner, the search engine 12 may be ready to receive the query 30 from the user device 14 via the network 20 to begin a web search.

Receiving the query 30 instructs the search engine 12 to initiate a web search. The search engine 12 may receive the query 30 from the user device 14. The query 30 may include at least one keyword or term. The search engine 12 may compare the at least one keyword in the query 30 to the index database to determine respective search results 32 comprising the web pages 24(1)-24(N2) earning the highest relevance rankings. In this manner, the most relevant web pages 24(1)-24(N2) maybe determined for the web search.

There are more factors to consider when determining the most relevant web pages 24(1)-24(N2) for the web search initiated by the user device 14. In one embodiment of the search engine 12, including the versioning system 36(1), the search engine 12 will further determine whether the respective query 30 originated from the user device 14 which was a type of either the mobile device 16A or the non-mobile device 16B. The search engine 12 may, for example, utilize information exchanged with the user device 14 as part of a transport protocol (e.g, RFC 1122) or metadata of the browser 28 of the user device 14 to determine the type of the user device 14 being utilized. In the case when the respective query 30 originated from the mobile device 16A, then for at least one of the web pages 24(1)-24(N2) of the search results 32, the search engine 12 will determine whether there are mobile versions 26A of the web pages 24(1)-24(N2) available as part of the website 25. The search engine 12 may determine whether there are these mobile versions 26A of the web pages 24(1)-24(N2), for example, by comparing entries on the index database 37 of the search engine 12. The search engine 12 may further determine and compare relevance rankings for the mobile version 26A and non-mobile versions 26B of the web pages 24(1)-24(N2). If the relevance ranking is as least as high for the mobile version 26A of the web page as opposed to the non-mobile version 26B based on the query 30, and the query 30 originated from the mobile device 16A (as opposed to the non-mobile device 16B), then the search engine 12 may include the mobile version 26A of the web page in the search results 32 as opposed to the non-mobile version 26B. Alternatively, if the relevance ranking is determined by the search engine 12 to be higher for the non-mobile version 26B of the website in the search results 32 than the mobile version 26A, then the search engine 12 may include the non-mobile version 26B for the web page in the search results 32 as opposed to the non-mobile version 26B regardless of whether the query 30 was submitted by the mobile device 16A or the non-mobile device 16B. If the non-mobile device 16B submitted the query 30, then only non-mobile versions 26B of the web pages may be included as part of the search results 32.

Once the search results 32 have been determined, the search engine 12 may send the search results to the user device 14. The search results 32 may include a listing of web pages in order of declining relevance ranking, with each web page of the search results 32 comprising a title, a portion of text and/or image extracted from the respective web page, and the URL of the web page. The search results 32 may be configured to be displayed by the mobile device 16A and/or the non-mobile device 16B, for example in a user interface device 60A, 60B (see FIGS. 3 and 4) such as a monitor, and thereby be presented to the user for review. In this manner, the user may then review the search results 32 to compare and/or select at least one of the web pages in the search results 32 with the user device 14 regardless of whether the user device 14 is the mobile device 16A or the non-mobile device 16B.

Figure 3:
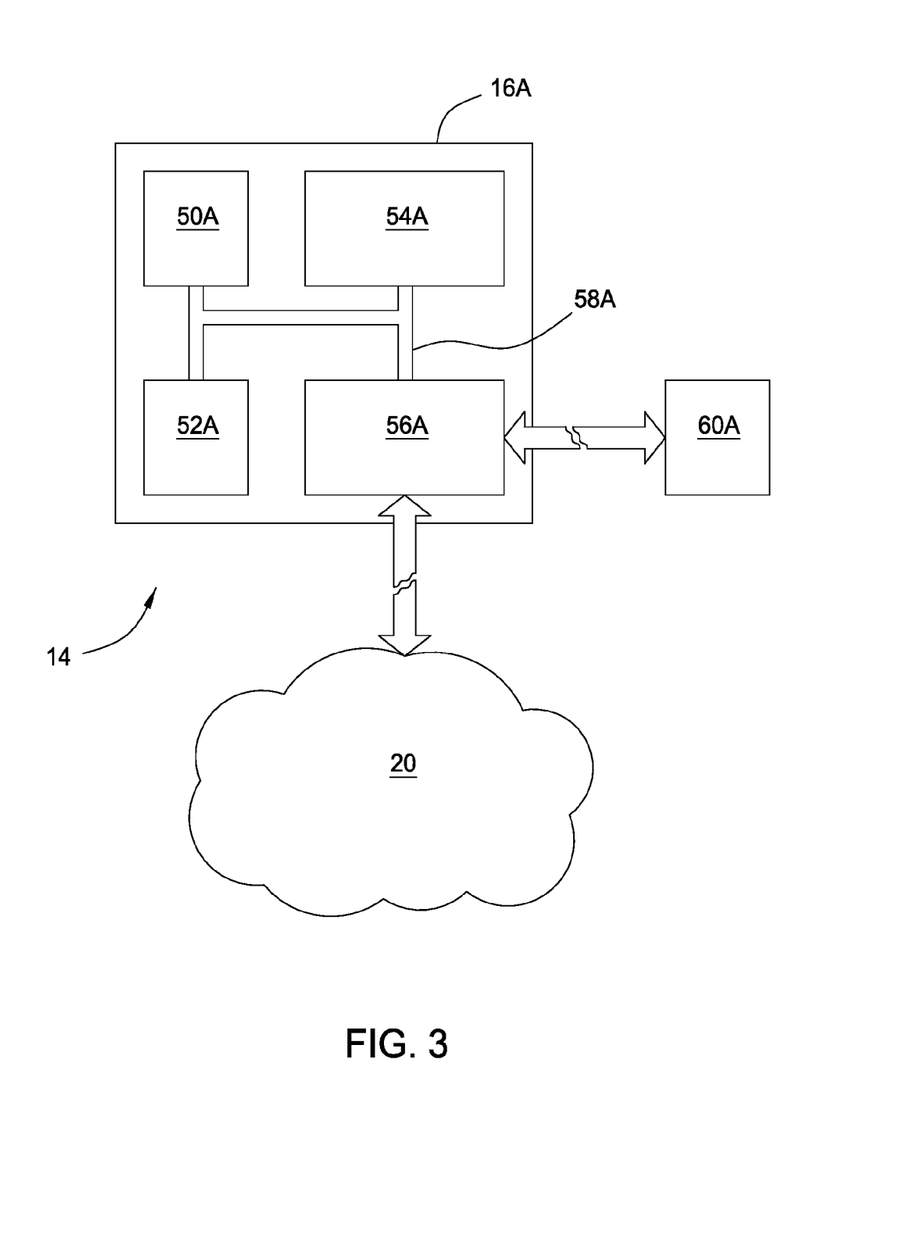
FIG. 3 is a schematic diagram of an exemplary embodiment of the mobile device of the networked environment of FIG. 1.

FIG. 3 is a schematic diagram of an exemplary embodiment of the mobile device 16A which could be the user device 14 depicted in FIG. 1. The mobile device 16A may be for example, a smartphone or other device having a size and weight compatible with convenient operation in different locations. In other non-limiting embodiments, a mobile device 16A may be a computing device which identifies itself to be a "mobile device" via metadata used in communications through the network 20, a computing device including a display screen less than twenty-five (25) square inches, a computing device identifying physical movement in communications through the network 20, a computing device identifying voice recognition capability in communications through the network 20, and/or a computing device allowing the user to enter the query 30 by touching a monitor (or display screen). The mobile device 16A may comprise a processor 50A, a memory 52A, a storage device MA, and an input/output device 56A interconnected with a system bus 58A. The mobile device 16A may also comprise the at least one user interface device 60A connected with the input/output device 56A to enable the user to enter the query 30, provide the instruction to submit the query 30 to the network 20 and thereby initiate a web search, review the search results 32 from the web search, select at least one web page from the search results 32, and display the web page 24(X) selected. The at least one user interface device 60A may include, for example, a display screen, monitor, keyboard, and/or an audio-recognition device. The processor 50A may execute instructions resident within the memory 52A and/or the storage device MA.

There are other features of the mobile device 16A. The memory 52A of the mobile device 16A may be configured to store information as part of the mobile device 16A and may be a computer-readable medium and may comprise volatile or non-volatile memory units, for example, dynamic random access memory (DRAM) units. The storage device MA may be configured to provide additional storage for the mobile device 16A. In one embodiment the storage device MA may be a computer-readable medium and may comprise, for example, at least one hard disk drive, at least one optical disk device, a large capacity storage device, and/or at least one network storage device shared by multiple computing devices over the network 20, or some other large capacity storage device. The input/output device 56A facilitates the arrival and departure of information between the mobile device 16A and the network 20. In one embodiment the input/output device 56A may, for example, comprise one or more of a network interface devices, e.g., an Ethernet card, a serial communication device, e.g., and RS-232 port, and/or a wireless interface device, e.g., and 802.11 card.

Figure 4:
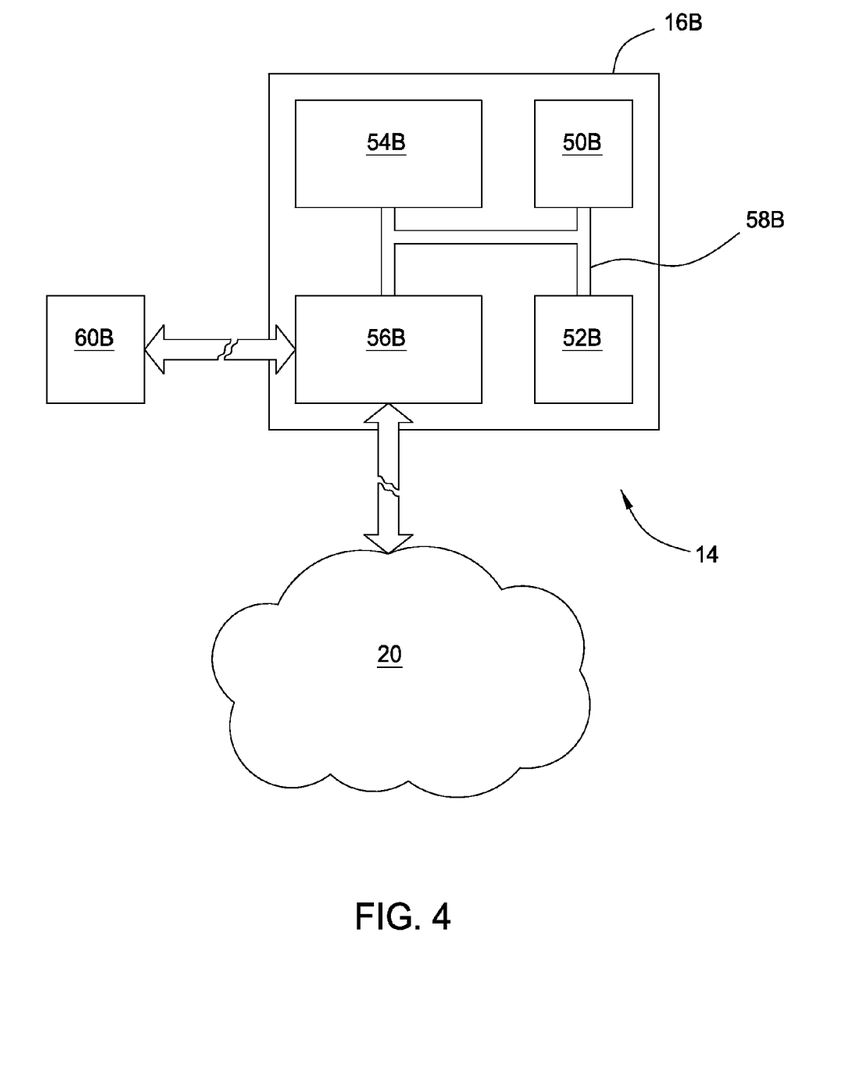
FIG. 4 is a schematic diagram of an exemplary embodiment of a non-mobile device compatible to replace the mobile device in the networked environment of FIG. 1.

FIG. 4 is a schematic diagram of an exemplary embodiment of the non-mobile device 16B which could be replace the mobile device 16A as the user device 14 depicted in FIG. 1 or be connected to the network 20 of the networked environment 10(1) along with the mobile device 16A The non-mobile device 16B may be, for example, a desktop computer connected to the network 20 with an Ethernet router (not shown). The non-mobile device 16B may comprise a processor 50B, a memory 52B, a storage device MB, and an input/output device 56B interconnected with a system bus 58B. The non-mobile device 16B may also comprise at least one user interface device 60B connected with the input/output device 56B to enable the user to enter the query 30, provide the instruction to submit the query 30 to the network 20 and thereby initiate a web search, review the search results 32 from the web search, select at least one web page from the search results 32, and display the web page selected. The at least one user interface device 60B may include, for example, a display screen, monitor, keyboard, and/or an audio-recognition device. The processor 50B may execute instructions resident within the memory 52B and/or the storage device MB.

There are other features of the non-mobile device 16B. The memory 52B of the non-mobile device 16B may be configured to store information as part of the non-mobile device 16B and may be a computer-readable medium and may comprise volatile or non-volatile memory units, for example, dynamic random access memory (DRAM) units. The storage device MB may be configured to provide additional storage for the non-mobile device 16B. In one embodiment the storage device 54B may be a computer-readable medium and may comprise, for example, at least one hard disk drive, at least one optical disk device, a large capacity storage device, and/or at least one network storage device shared by multiple computing devices over the network 20, or some other large capacity storage device. The input/output device 56B facilitates the arrival and departure of information between the non-mobile device 16B and the network 20. In one embodiment the input/output device 56B may, for example, comprise one or more of a network interface devices, e.g., an Ethernet card, a serial communication device, e.g., and RS-232 port, and/or a wireless interface device, e.g., and 802.11 card.

Figure 5:
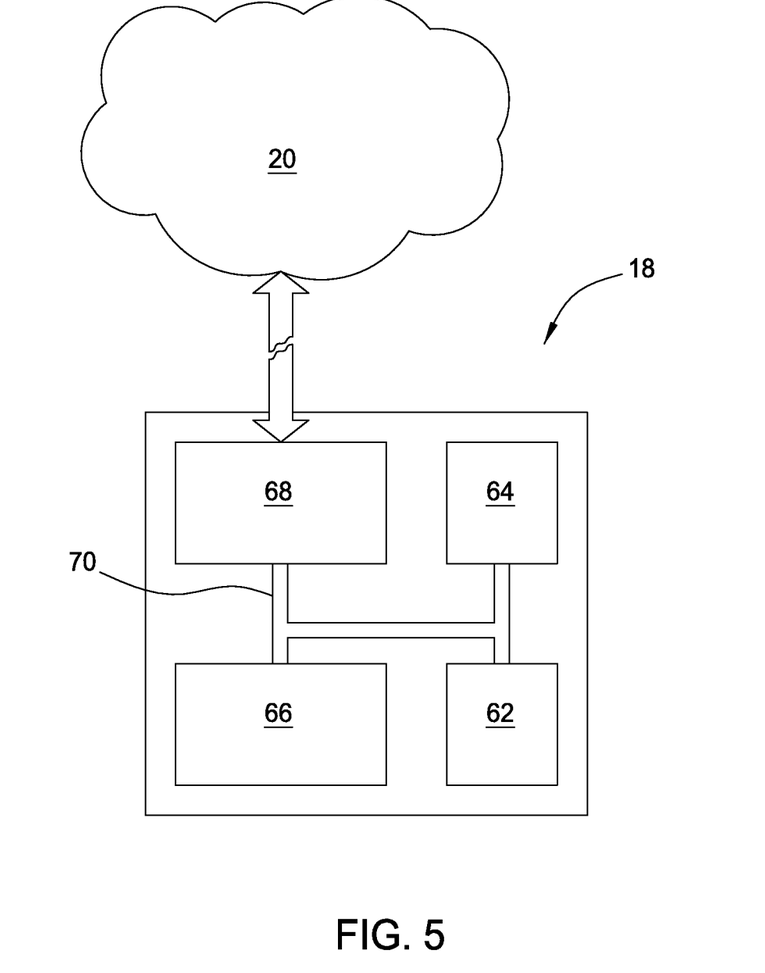
FIG. 5 is a schematic diagram of an exemplary embodiment of a web server of the networked environment of FIG. 1.

The web server 18 may also be included as part of the networked environment 10(1). FIG. 5 is a schematic diagram of an exemplary embodiment of the web server 18. The web server 18 may be for example, a combination of hardware and software to store and make available the web pages over the network 20. The web server 18 may comprise a processor 62, a memory 64, a storage device 66, and an input/output device 68 interconnected with a system bus 70. The processor 62 may execute instructions resident within the memory 64 and/or the storage device 66.

Other features of the web server 18 include the memory 64, which may be configured to store information as part of the web server 18 and may be a computer-readable medium and may comprise volatile or non-volatile memory units, for example, dynamic random access memory (DRAM) units. The storage device 66 may be configured to provide additional storage for the web server 18. In one embodiment the storage device 66 may be a computer-readable medium and may comprise, for example, at least one hard disk drive, at least one optical disk device, a large capacity storage device, and/or at least one network storage device shared by multiple computing devices over the network 20, or some other large capacity storage device. The input/output device 68 facilitates the arrival and departure of information between the web server 18 and the network 20. In one embodiment the input/output device 68 may, for example, comprise one or more of a network interface devices, e.g., an Ethernet card, a serial communication device, e.g., an RS-232 port, and/or a wireless interface device, e.g., and 802.11 card.

Figure 6:
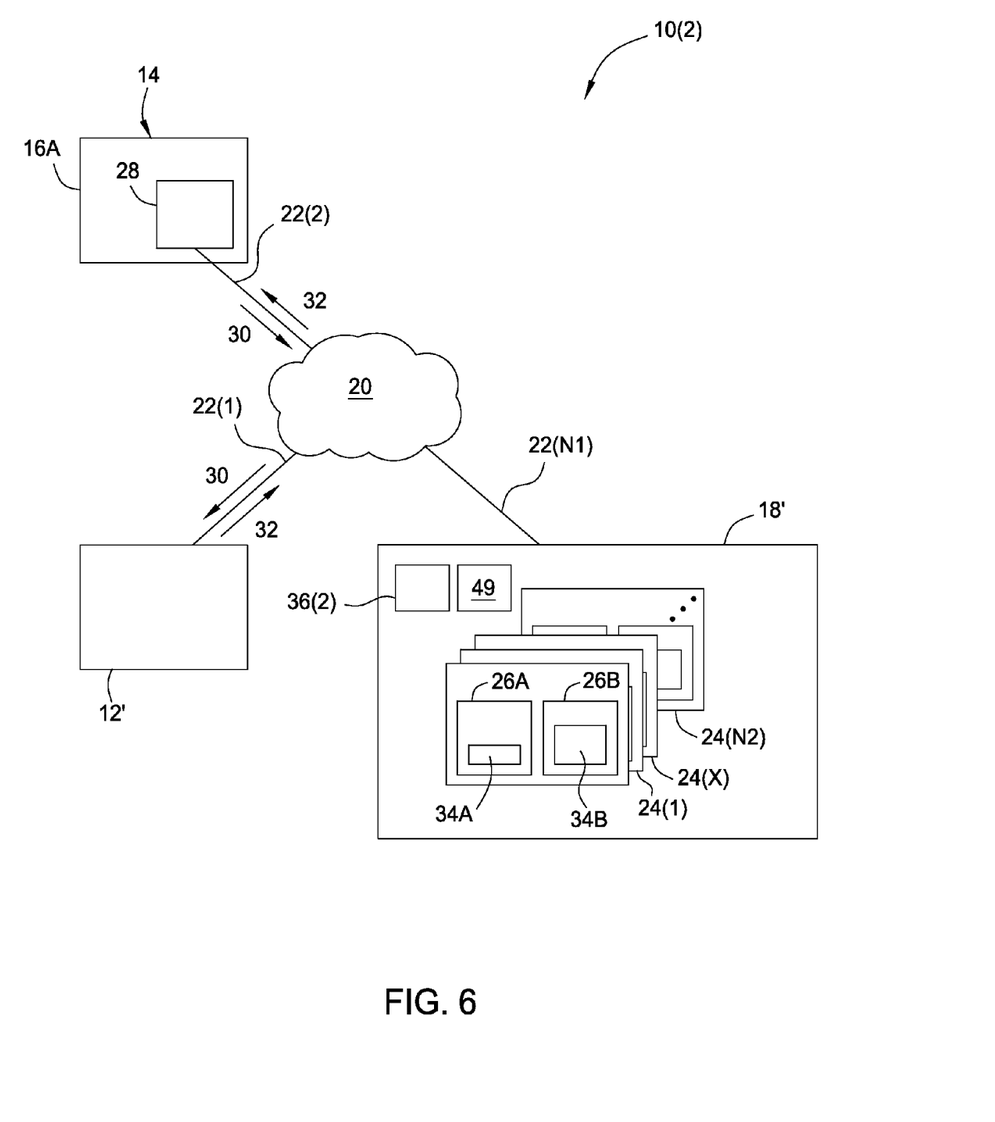
FIG. 6 is a schematic diagram of another embodiment of an exemplary networked environment similar to the networked environment of FIG. 1, however a versioning system is disposed at a web server instead of a search engine.
Figure 7:
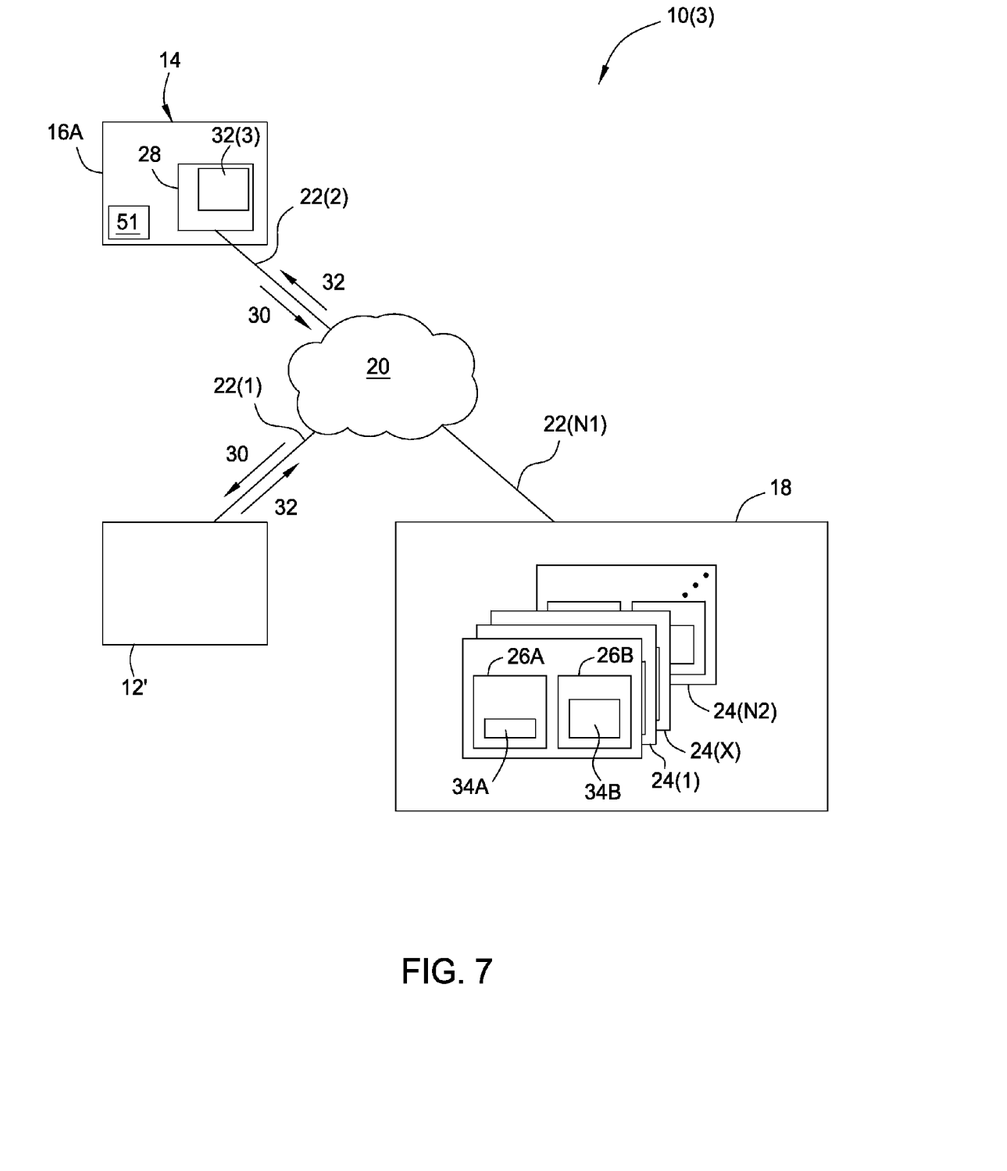
FIG. 7 is a schematic diagram of yet another embodiment of an exemplary networked environment similar to the networked environment of FIG. 1, however a versioning system is disposed at a user device, for example, in a browser or application instead of a search engine.

Now that the components of the networked environment 10(1) have been discussed, other embodiments of a networked environment 10(2), 10(3) are now discussed relative to FIGS. 6 and 7, respectively. In this regard, FIG. 6 is a schematic diagram of another embodiment of an exemplary networked environment 10(2) similar to the networked environment of FIG. 1, and so to promote conciseness and clarity only the differences will be discussed. In this regard, a versioning system 36(2) may be disposed at a web server 18' instead of the search engine 12, and the search engine 12' may be free of the versioning system 36(1) and otherwise similar to the search engine 12. The versioning system 36(2) may be used to determine whether the type of the user device 14 which sent the query 30 and whether to deliver the mobile version 26A or the non-mobile version 26B of the web pages to the user as part of the search results 32. In this regard, the versioning system 36(2) may comprise computer instructions as part of a computer program product disposed at the web server 18' including a computer-readable storage medium having computer-readable program code configured to perform the computer instructions. In this manner, the user may more efficiently receive the desired content by receiving either the mobile version 26A or non-mobile version 26B of the web page selected by the user as part of the web search.

Specifically, the user may enter the query 30 as part of the web search to the search engine 12'. The search engine 12' may return the search results 32 comprising the list of web pages to the user device 14. The user may select one web page of the search results 32. The web page selected may include a URL to the web server 18' where the web page selected is located. The versioning system 36(2) of the web server 18' may identify whether the type of the user device 14 is a mobile device 16A or a non-mobile device 16B. Then, the versioning system 36(2) may create a database index 49 of the web pages of the website containing the selected web page to determine the mobile version 26A and the non-mobile version 26B of the web page. The versioning system 36(2) may receive the query 30 from the browser 28 of the user device 14. Then, the versioning system 36(2) may determine relevance rankings for the mobile version 26A and the non-mobile version 26B of the web page selected based on relevance criteria using the query 30. The relevance criteria may be based on at least one of: a presence or absence in the resources 34A, 34B of terms in the query 30, occurrence in the resources 34A, 34B of the terms in the query 30, relative positions in the resources 34A, 34B of terms in the query 30, and statistics of previous visitations of the types of user devices 14 to the mobile version 26A and the non-mobile version 26B of the web page 24(X). The versioning system 36(2) of the web server 18' may then determine which one of the mobile version 26A or the non-mobile version 26B of the website will be delivered to the user device 14 based on which has a higher relevance ranking and the type of the user device 14 using a similar methodology as the versioning system 36(1).

FIG. 7 is a schematic diagram the networked environment 10(3) which is similar to the networked environment 10(1) of FIG. 1, and so only the differences will be discussed to promote conciseness and clarity. In this regard, the networked environment 10(3) comprises a versioning system 36(3) disposed at the user device 14' instead of the search engine 12 and the search engine 12' may be free of the versioning system 36(1). The versioning system 36(3) may comprise computer instructions as part of a computer program product disposed at the user device 14' including a computer-readable storage medium having computer-readable program code configured to perform the computer instructions. In this manner, the user may more efficiently receive the desired content by receiving either the mobile version 26A or non-mobile version 26B of the web pages 24(1)-24(N2).

Specifically, the user may enter the query 30 as part of the web search to the search engine 12'. The search engine may return the search results 32 comprising the list of web pages to the user device 14. The user may select one web page of the list of web pages provided as part of the search results. The web page selected may include a URL to the web server 18' where the web page selected is located. The browser 28 of the user device 14 may identify whether the type of the user device 14 is a mobile device 16A or a non-mobile device 16B based on, for example, the settings of the browser 28. The versioning system 36(23) of the browser 28 may detect that a user clicks on a link in a search results 32 to the web page 24(X), the browser 28 can temporarily dynamically update its metadata to retrieve both the mobile version 26A and the non-mobile version 26B of the web page 24(X). The versioning system 36(3) of the browser 28 uses the query 30 to perform a relevance ranking on the mobile version 26A and the non-mobile version 26B of the web page 24(X), retrieve the full version for the user. The relevance criteria may be based on at least one of: a presence or absence in the resources 34A, 34B of terms in the query 30, occurrence in the resources 34A, 34B of the terms in the query 30, relative positions in the resources 34A, 34B of terms in the query 30, and statistics of previous visitations of the types of user devices 14 to the mobile version 26A and the non-mobile version 26B of the web pages 24(X). The versioning system 36(3) of the user device 14' may then determine which one of the mobile version 26A or the non-mobile version 26B of the web pages 24(1)-24(N2) will be delivered to the user device based on which has a higher relevance ranking and the type of the user device 14 based on using a similar methodology as the versioning system 36(1).

Figure 8:
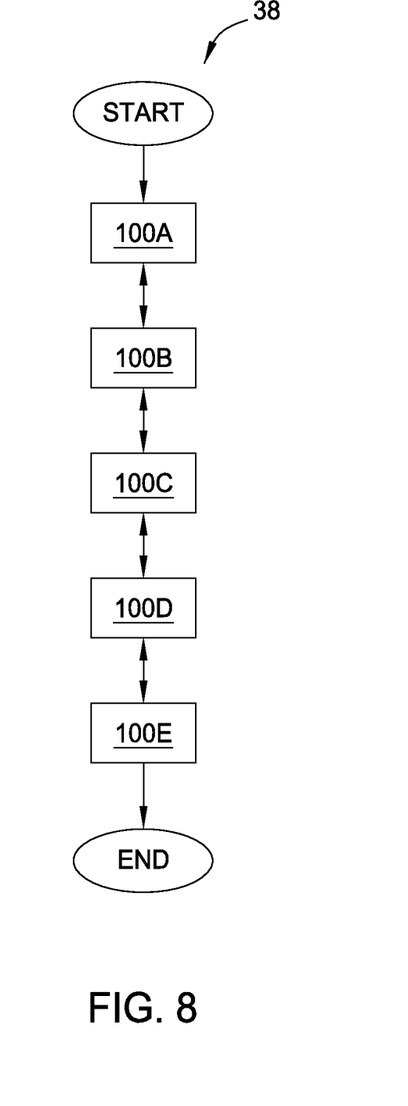
FIG. 8 is a flowchart of an exemplary method for delivering the non-mobile version or the mobile version of the web page of the website hosted on the web server in response to a web search.

Now that the components and embodiments of the networked environments 10(1)-10(3) have been discussed, FIG. 8 depicts a flowchart of the exemplary method 38 for delivering the non-mobile web page or the mobile web page from a website hosted on the web server 18 in response to a web search. The exemplary method 38 includes the steps 100A-100E and is discussed in detail below using the terminology discussed above.

The method 38 may include receiving the query for a web search from the user device (step 100A in FIG. 8). The method 38 may also include identifying the web page 24(X) of the website 25 with the web search based on the query 30. The website 25 comprising the mobile version 26A of the web page 24(X) and the non-mobile version 26B of the web page 24(X) (step 100B in FIG. 8). The identifying the web page 24(X) with the web search may identify the non-mobile version 26B of the web page. The mobile version 26A of the web page 24(X) may include fewer alphanumeric characters or other content as may be included in the non-mobile version 26B of the web page 24(X).

The method 38 may also include identifying the type of the user device 14 (step 100C in FIG. 8). The type being one of the mobile device 16A and the non-mobile device 16B. One of the versioning systems 36(1)-36(3) may be used to identify the type of the user device 14. In this manner, the type of the user device 14 may be used to determine which of the mobile version 26A and the non-mobile version 26B of the web page 24(X) should be best delivered to the user device 14.

The method 38 may also include comparing the relevance rankings based on the query 30 for the mobile version 26A and the non-mobile version 26B of the web page 24(X) (step 100D in FIG. 8). The comparing the relevance rankings may comprise determining the relevance rankings for the mobile version 26A and the non-mobile version 26B of the web page 24(X) based on at least one of: a presence or absence in the resources 34A, 34B of terms in the query 30, occurrence in the resources 34A, 34B of the terms in the query 30, relative positions in the resources 34A, 34B of terms in the query 30, and statistics of previous visitations of the types of user devices 14 to the mobile version 26A and the non-mobile version 26B of the web pages 24(X). In this manner, the mobile version 26A may be compared against the non-mobile version 26B relative to the query 30.

The method 38 may also include determining the version of the web page 24(X) to be received by the user device 14 (step 100E in FIG. 8). The version of the web page 24(X) may be determined by being one of the mobile version 26A and the non-mobile version 26B. The determining the version of the web page 24(X) may occur according to one of computer instructions of the versioning systems 36(1)-36(3) respectively disposed at: the browser 28 of the user device 14; the web server 18' hosting the mobile version 26A and the non-mobile version 26B of the web page 24(X); or the search engine 12'. The computer instructions may be part of a computer program product including a computer-readable storage medium having computer-readable program code configured to perform the computer instructions.

The determining the version of the web page 24(X) may be based on the type of the user device 14 and the comparing of the relevance rankings of the mobile version 26A and the non-mobile version 26B of the web page 24(X). The determining the version of the web page 24(X) may comprise making available to the user device 14 the non-mobile version 26B of the web page 24(X), if the relevance ranking of the non-mobile version 26B of the web page 24(X) is higher than the relevance ranking of the mobile version 26A of the web page 24(X) and if the type of the user device 14 is the mobile device 16A.

Alternatively, the determining the version of the web page 24(X) comprises making available to the user device 14 the mobile version 26A of the web page 24(X) if the mobile device 16A is performing the web search and the relevance ranking of the mobile version 26A of the web page 24(X) is at least as high as the relevance ranking of the non-mobile version 26B of the web page 24(X). It is also noted that the determining the version of the web page 24(X) comprises making available to the user device 14 the non-mobile version 26B of the web page 24(X) if the user device 14 is the non-mobile device 16B. In this manner, fewer retrievals of the mobile version 26A of the web page 24(X) of the website 25 may occur as desired information available as part of the non-mobile version 26B of the web page 24(X) may be delivered more efficiently to the user of the mobile device 16A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and schematic block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

While the foregoing is directed to embodiments of the present invention, other and further embodiments of the invention may be devised without departing from the basic scope thereof, and the scope thereof is determined by the claims that follow.

What is claimed is:

1. A method of data processing in a networked environment, comprising:
   receiving a first query for a web search from a first user device;
   receiving, from the first user device, a selection of a web page of a website from a plurality of websites provided as search results from the web search based on the first query, the website comprising a mobile version of the web page and a non-mobile version of the web page;
   identifying a type of the first user device as being a mobile device;
   determining relevance rankings for the mobile version and the non-mobile version of the web page, based on the first query and based on one or more statistics of previous visitations to the mobile version of the web page, the statistics comprising instances in which a user device requests the non-mobile version of the web page after being presented with the mobile version of the web-page, and;
   comparing the relevance rankings for the mobile version and the non-mobile version of the web page and
   selecting the non-mobile version of the web page for transmission to the first user device, based on the identified type of the first user device being a mobile device and further based on a determination that the relevance ranking of the non-mobile version of the web page is higher than the relevance ranking of the mobile version of the web page.

2. The method of claim 1, wherein the method further comprises:
   receiving a second query for a web search from a second user device;
   receiving, from the second user device, a selection of a web page of a website from a plurality of websites provided as search results from the web search based on the second query, the website comprising a mobile version of the web page and a non-mobile version of the web page;
   identifying a type of the second user device as being a non-mobile device;
   determining relevance rankings for the mobile version and the non-mobile version of the web page, based on the second query and based on one or more statistics of previous visitations to the mobile version of the web page, the statistics comprising instances in which a user device requests the mobile version of the web page after being presented with the non-mobile version of the web-page, and;
   comparing the relevance rankings for the mobile version and the non-mobile version of the web page and
   selecting the mobile version of the web page for transmission to the second user device, based on the identified type of the second user device being a non-mobile device and further based on a determination that the relevance ranking of the mobile version of the web page is higher than the relevance ranking of the non-mobile version of the web page.

3. The method of claim 1, wherein the identifying the web page with the web search identifies the non-mobile version of the website.

4. The method of claim 1, wherein the determining the relevance rankings for the mobile version and the non-mobile version is based on at least one of: a presence or absence of terms in the first query, occurrence of the terms in the first query, and relative positions of terms in the first query.

5. The method of claim 1, wherein the mobile version of the web page includes fewer alphanumeric characters than the non-mobile version.

6. The method of claim 1, wherein the selecting the version of the web page occurs according to computer instructions disposed at the browser of the mobile device.

7. The method of claim 1, wherein the selecting the mobile version of the web page occurs according to computer instructions disposed at a web server hosting the mobile version and the non-mobile version of the website.

8. The method of claim 1, wherein the selecting the mobile version of the web page occurs according to computer instructions disposed at the search engine.

9. The method of claim 1, wherein the one or more statistics of previous visitations to the mobile version of the web page comprises a percentage of instances in which a user device requests the mobile version of the web page after being presented with the non-mobile version of the web page.

10. A method of data processing in a networked environment, comprising:
    receiving a query for a web search from a user device;
    receiving, from the user device, a selection of a web page of a website from a plurality of websites provided as search results from the web search based on the query, the website comprising a mobile version of the web page and a non-mobile version of the web page;
    identifying a type of the user device as a mobile device;
    determining a percentage of previous instances in which a user device requests the mobile version of the web page after being presented with the non-mobile version of the web page; and
    transmitting the non-mobile version of the web page to the user device, based on the identified type of the user device being a mobile device and further based on the determined percentage being above a threshold percentage.

* * * * *